(12) United States Patent
Scholte

(10) Patent No.: US 6,937,718 B2
(45) Date of Patent: Aug. 30, 2005

(54) METHOD AND APPARATUS FOR PERSONALIZED CONFERENCE AND HANDS-FREE TELEPHONY USING AUDIO BEAMING

(75) Inventor: Alexander Martin Scholte, Chatswood (AU)

(73) Assignee: Avaya Technology Corp., Basking Ridge, NJ (US)

( * ) Notice: Subject to any disclaimer, the term of this patent is extended or adjusted under 35 U.S.C. 154(b) by 335 days.

(21) Appl. No.: 10/235,224

(22) Filed: Sep. 4, 2002

(65) Prior Publication Data

US 2004/0042615 A1 Mar. 4, 2004

(51) Int. Cl.[7] ............................................. H04M 1/00
(52) U.S. Cl. .......................... 379/388.02; 379/388.04; 381/77; 381/79
(58) Field of Search .................... 379/388.02, 388.04; 381/77, 79

(56) References Cited

U.S. PATENT DOCUMENTS

| | | | |
|---|---|---|---|
| 6,229,899 B1 | 5/2001 | Norris et al. | 381/77 |
| 6,359,990 B1 | 3/2002 | Norris | 381/77 |
| 6,466,674 B1 * | 10/2002 | Norris | 381/93 |
| 6,556,687 B1 * | 4/2003 | Manabe | 381/387 |
| 6,606,389 B1 * | 8/2003 | Selfridge et al. | 381/111 |
| 2001/0007591 A1 | 7/2001 | Pompei | 381/111 |

OTHER PUBLICATIONS

Schneider, "In the Audio Spotlight: A sonar technique allows loudspeakers to deliver focused sound beams", *Scientific American*, Oct., 1998, available at http://www.sciam.com/1998/1098issue/109techbus2.html.

Pompel, overview of "The Audio Spotlight," published by The MIT Media Laboratory, 1999, available at http://web-.media.mit.edu/~pompei/nonlin.html/.

Diederichs, "Ultrasonic Testing in Pipe Extrusion: Transducer and Sound Field", *The e-Journal of Nondestructive Testing*, published by NDT.net, Dec. 18, 1995, available at http://www.ndt.net/article/rohrext/us_pk/us_pk_e.htm.

* cited by examiner

*Primary Examiner*—Jefferey F. Harold
(74) *Attorney, Agent, or Firm*—Sheridan Ross P.C.

(57) ABSTRACT

The present invention is directed to the provision of a personalized speaker phone and hands-free telephony. In particular, the present invention allows communications to be output along a narrowly defined path, rather than being broadcast. In this way, a private voice communication signal can be provided to a user, even though the user is not holding the output device to the user's ear. Furthermore, by providing audible signals along narrowly defined paths, different audible signals may be provided to users at the same location, without interfering with one another.

27 Claims, 4 Drawing Sheets

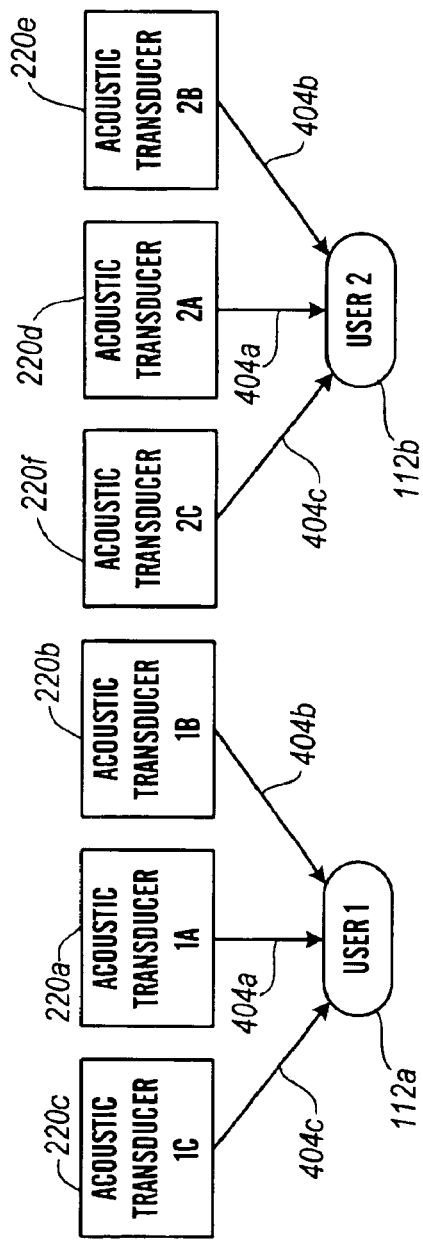
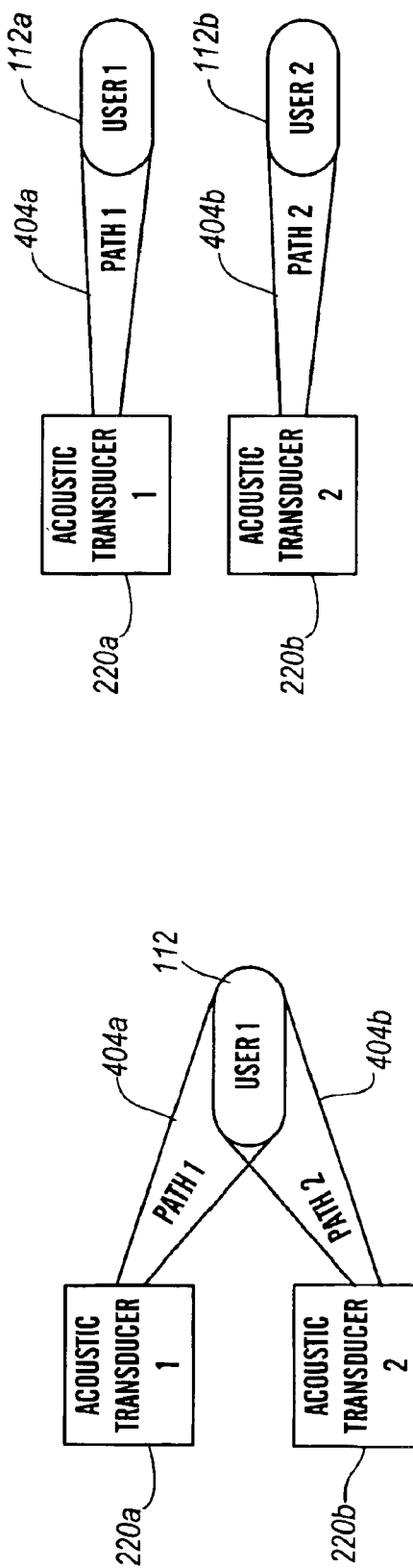
FIG. 5
FIG. 4B
FIG. 4A

METHOD AND APPARATUS FOR PERSONALIZED CONFERENCE AND HANDS-FREE TELEPHONY USING AUDIO BEAMING

FIELD OF THE INVENTION

The present invention relates to a method and apparatus for personalized conference and hands-free telephony. In particular, the present invention relates to the use of audio beaming techniques in connection with voice telephony.

BACKGROUND OF THE INVENTION

It is often convenient to enable voice communications without requiring the use of a handset or headset to locate a microphone adjacent the mouth of a user and a speaker adjacent an ear of the user. Accordingly, speaker phones using broadcast speakers in combination with far talk microphones are available. However, conventional speaker phones are disruptive when used in open or cubical type office floor plans. In addition, it is often impossible to have a private conversation using a speaker phone in an office environment.

Conventional speaker phones also have limitations when used in connection with group conference calls. In particular, because speaker phones broadcast their output, it is impossible for individual participants at a location to independently control the volume of the sound. In addition, the broadcasting of output prevents different participants at a location from receiving different audio streams. For example, broadcasting a version of the output in a first language while at the same time broadcasting a version of the output in one or more additional languages results in high ambient noise levels and would be generally unintelligible due to the multiple different audio sources. Furthermore, the use of one or more conventional speakers to broadcast an output results in only a limited ability to provide spatial information, which can be used to assist listeners in identifying the source of audible information being received (e.g., to identify the person speaking).

In addition, conventional speaker phones used in combination with far talk microphones can result in the creation of echoes in a transmitted signal. In particular, a microphone provided in connection with a conventional speaker phone receives the output from the speaker, as well as signals provided by the user or users of the speaker phone. Accordingly, conventional speaker phones must prevent or cancel echoes created by the reception of speaker output by the microphone. For example, speaker phones may incorporate digital signal processors operating to remove echoes from transmitted voice signals. Another existing technique to avoid echo is to switch a half duplex channel between transmission and reception based on the voice activity detected at each end. This technique generally reduces voice quality and conference interaction through introducing artifacts such as speech clipping and difficulties associated with interrupting the current talker. However, the use of digital signal processors increases the cost of the speaker phone. Conventional speaker phones may also avoid echoes by providing directional microphones. However, directional microphones are expensive, and are ineffective in certain circumstances, such as when a speaker is moving about the room.

In order to provide spatial information, techniques utilizing multiple audio channels have been developed. Although such techniques are promising in connection with home theaters and computer game applications, the listener's ears must be located within a narrowly defined sweet spot. In addition, the orientation of the listener influences the accuracy with which spatial information is provided. Because the sweet spot encompasses a restricted area, and because the orientation of the listener must be known, such techniques are not particularly useful in connection with a conference call scenario in which participants sit around a speaker phone located in the middle of a table.

In order to provide a targeted source of sound, techniques that take advantage of the non-linear properties of air to create a narrow beam of sound have been developed. For example, parametric audio systems utilizing arrays of acoustic transducers are known. Such systems take advantage of the non-linear characteristics of air to create an audible signal from the interaction of ultrasonic signals and the air. Such systems have been successful in creating an audio source along an audio path defined by ultrasonic signals emitted by a parametric speaker. However, the advantages of such systems in connection with personalized conference and hands-free telephony has not heretofore been recognized or applied.

SUMMARY OF THE INVENTION

The present invention is directed to solving these and other problems and disadvantages of the prior art. Generally, according to the present invention, a speaker phone having a directional parametric speaker is provided to facilitate personalized conference and hands-free telephony. In particular, parametric transducers provided as part of a parametric speaker are supplied with signals received from or in connection with a voice communication device. The transducers are aligned such that an audible output produced by the directional parametric speaker system intersects a position occupied by an intended listener.

In accordance with the present invention, a method for providing a private speaker phone output signal is disclosed. The method includes providing a voice communication device, and receiving at the voice communication device a transmitted first voice signal. A first ultrasound signal is output from a first acoustic transducer or first array of transducers to produce an audible reproduction of the first voice signal along a first projection path.

According to a further embodiment of the present invention, the microphone is provided in connection with the voice communication device. Thus, the method may further include transmitting a voice signal received at the microphone. For example, a voice signal may be received from a listener positioned within the projection path of the first acoustic transducer.

In accordance with yet another embodiment of the present invention, a second voice signal is received at the voice communication device. An ultrasonic signal is output from a second acoustic transducer or a second array of transducers to produce an audible reproduction of the second voice signal along a second projection path. In accordance with an embodiment of the present invention, the first and second projection paths converge or intersect, for example at a position occupied by a listener. Accordingly, the first and second voice signals may provide first and second channels of a stereo signal, or may comprise separate voice signals, in which case the provision of the separate voice signals along different projection paths allows for spatial cues to be provided, which assists listeners identifying the person then speaking in a conference call scenario. In accordance with still another embodiment of the present invention, the first projection path is directed towards a first listener and the second projection path is directed towards a second listener. Accordingly, each listener may be provided with an audio signal that is not broadcast within the room. This can be used in furtherance of privacy considerations, or to provide separate channels to the different listeners. For example, the first listener may receive a version of a audio signal in a first language, and the second listener may be provided with a version of the audio signal in a second language.

In accordance with an embodiment of the present invention, a speaker phone apparatus for providing personalized conferencing and hands-free telephony is provided. In particular, a speaker phone utilizing one or more directional parametric speaker systems for producing a signal that can be perceived by a listener located along the path of the beam is provided. In accordance with an embodiment of the present invention, the speaker phone apparatus includes a first transmitted voice signal input. In addition, the speaker phone includes a first oscillator for producing a first carrier signal. A first modulator receives the first transmitted voice signal and the first carrier signal, and outputs a first modulated signal. The first modulated signal is provided to a first acoustic transducer, which produces a reproduction of the translated voice signal along a first projection path. In accordance with an embodiment of the present invention, the acoustic transducer comprises an array having a plurality of transducer elements. The transducer elements may comprise membrane elements or piezoelectric elements.

In accordance with yet another embodiment of the present invention, a broadcast speaker may be provided as part of the speaker phone apparatus. Accordingly, in a first mode of operation, and area limited output is provided by the acoustic transducer, and in a second mode of operation a broadcast output is provided by the speaker. In accordance with still a further embodiment of the present invention, a microphone may be provided as part of the speaker phone for receiving a voice signal from a user of the speaker phone.

BRIEF DESCRIPTION OF THE DRAWINGS

FIG. 4A depicts a relationship between transducer elements and a user;

FIG. 4B depicts an arrangement of transducer elements and first and second users;

FIG. 5 depicts a relationship between multiple transducer elements and multiple users;

DETAILED DESCRIPTION

The present invention is directed to a voice communication method and device for providing personalized conference and hands-free telephony.

Figure 1:
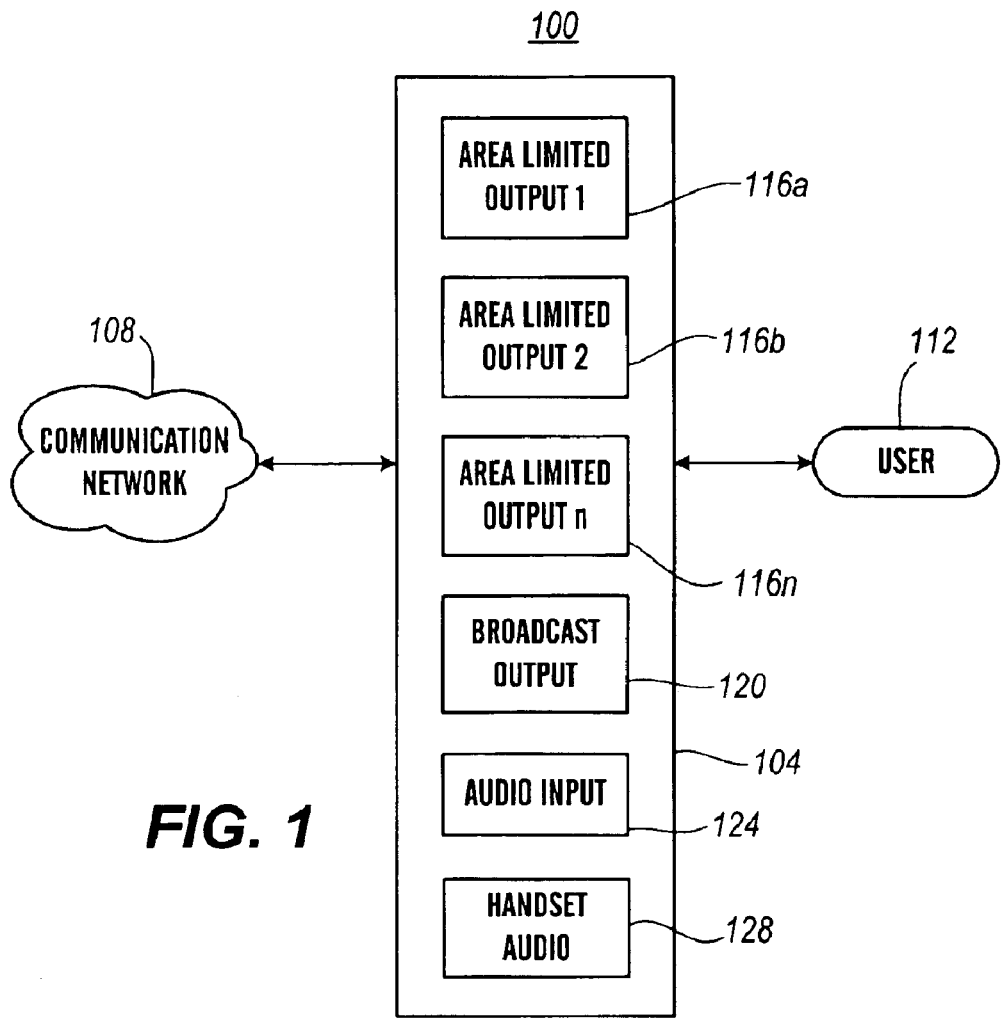
FIG. 1 is a block diagram of a communication arrangement incorporating a voice communication device in accordance with an embodiment of the present invention.

In FIG. 1, a voice communication system 100 incorporating a voice communication device 104 for providing personalized conference and hands-free telephony in accordance with an embodiment of the present invention is illustrated in block diagram form. In general, the communication system 100 includes a communication network 108, the voice communication device 104, and a user 112, located proximate to the voice communication device 104. In general, transmitted voice signals are received at the voice communication device 104 from the communication network 108 and provided to the user 112. Similarly, the user may provide a voice signal to the voice communication device 104 that is in turn provided to the communication network 108. As can be appreciated, a conventional voice communication device, or a voice communication device 104 in accordance with an embodiment of the present invention is typically the source of voice communications provided to the voice communication device 104 proximate to the user 112, and the recipient of voice signals provided by the user 112. As can further be appreciated, multiple conventional communication devices or voice communication devices 104 in accordance with the present invention may be conferenced together through the communication network 108.

The voice communication device 104 generally includes one or more area limited output systems 116, such as parametric speaker systems, for providing an output of a transmitted voice signal received from the communication network 108 along a defined path. Accordingly, and as will be described in greater detail below, the voice communication device 104 may provide a personalized audio stream to one or more users 112. In addition or alternatively, the voice communication device 104 may provide spatial cues to the user 112, or multiple users independent of the differences between their orientation and position around the communication device, regarding the identity of the talker (i.e. the source of a voice communication signal received at the voice communication device 104). In providing such spatial cues, each talker may be assigned to a dedicated communication channel. In accordance with another embodiment of the present invention, information regarding the identification of a talker may be transmitted, either as an in-band or out of band signal, to the communication device 104 so that the communication device 104 can assign a signal to an appropriate output (e.g., an appropriate area limited output system 116). In addition, the voice communication device 104 may include a conventional broadcast speaker 120. The broadcast speaker 120 may be utilized for announcements of general applicability to all users 112 of the voice communication device 104, or where use of a conventional broadcast output in lieu of an area limited output is desired. The voice communication device 104 may additionally include a microphone 124 for receiving voice communications from the user or users 112. Furthermore, the voice communication device 104 may comprise a conventional telephone broadcast 128 having a conventional speaker and microphone.

Although a single user 112 is illustrated in FIG. 1, it can be appreciated that any number of users 112 may be associated with the voice communication device 104. In addition, multiple broadcast speakers 120 may be provided. Also, multiple microphones 124 may be provided, for example one microphone 124 for each user 112 associated with the voice communication device 104. In addition, it should be appreciated that, although the present description discusses the receipt and provision of transmitted voice signals, the voice communication device 104 disclosed herein may be used in connection with the provision to a user 112 of any type of signal that is capable of being transmitted across a communication network 108. For example, the term voice communication may include music and signal tones.

The communication network 108 may generally include a single network or assemblage of networks capable of transmitting voice communications, including real time voice communications. For example, the communication network 108 may comprise a switched circuit network, such as the public switched telephony network, or a packet data network, such as a local area network or the Internet.

The user 112 is generally a person situated in the proximity of the voice communication device 104. Accordingly, the user 112 is a listener with respect to audio signals received from an area limited output system 116 or speaker 120 of the voice communication device 104. Furthermore, the user 112 is a talker with respect to voice communications provided to the communication network 108 through the microphone 124 of the voice communication device 104. As can be appreciated, multiple users 112 may be associated with a single voice communication device 104.

Figure 2:
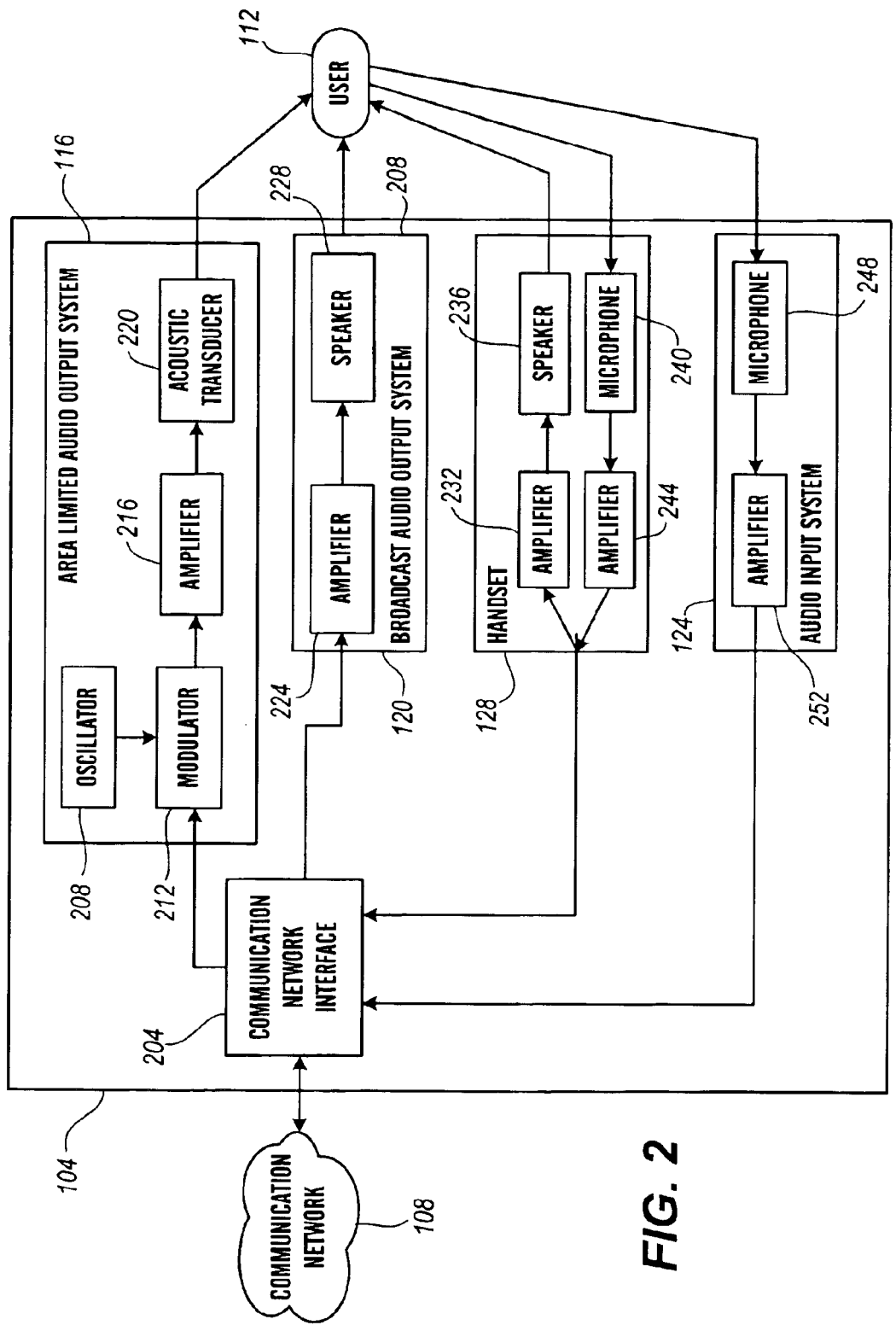
FIG. 2 is a block diagram depicting features of a voice communication device in accordance with an embodiment of the present invention.

With reference now to FIG. 2, functional components of a voice communication device 104 in accordance with an embodiment of the present invention are illustrated. In general, the voice communication device 104 includes an area limited output system 116, a broadcast audio output system 120, an audio input system 124, and a handset (or headset) audio system 128. In addition, the voice communication device 104 includes a communication network interface 204 through which the voice communication device 104 is interconnected to the communication network 108.

As shown in FIG. 2, the area limited output system 116 generally includes an oscillator 208, a modulator 212, an amplifier 216, and an acoustic transducer 220. In general, the oscillator 208 provides a carrier signal to the modulator 212. In accordance with an embodiment of the present invention, the frequency of the carrier signal provided by the oscillator 208 is ultrasonic. For example, the carrier frequency provided by the oscillator 208 may be above about 40 kHz. As can be appreciated by one of skill in the art, the oscillator 208 may comprise any device capable of providing an electronic signal at the desired carrier frequency to the modulator 212.

In addition to the carrier signal received from the oscillator 208, the modulator 212 receives an electrical signal from the communication network interface 204. In general, the signal received from the communication network interface 204 represents a voice communication or other audible signal. In a typical application, the electric signal is received from the communication network 108. For example, the electrical signal is received from a second voice communication device 104, or a conventional voice communication device, interconnected to the voice communication device 104 through the communication network 108. The modulator 212 generally modulates the carrier signal received from the oscillator 208 using the electrical representation of the audio signal received from the communication network interface 204. Accordingly, the modulator 212 may comprise a conventional amplitude modulation modulator. In accordance with another embodiment of the present invention, the oscillator 208 and/or the modulator 212 may be embodied in a digital form and executed as software on a DSP (Digital Signal Processor). The modulated signal produced by the modulator 212 is provided to an amplifier 216. The amplifier 216 generally provides an amplified version of the modified signal to an acoustic transducer 220.

The acoustic transducer 220 receives the modulated carrier signal and produces a corresponding output. In particular, because the modified carrier signal comprises ultrasonic frequencies, the output from the acoustic transducer 220 may be considered ultrasonic, particularly in the immediate vicinity of the acoustic transducer 220. However, because of the non-linear nature of air, a signal within the human audible frequency range is produced through the interaction of the carrier signal and the single or double side bands associated with that signal. Examples of systems suitable for producing human audible frequencies along a narrowly defined projection path of an acoustic transducer can be found in U.S. Pat. No. 6,359,990 B1 to Norris and U.S. Patent Application Publication No. 2001/0007591A1 in the name of Pompei, the disclosures of which are specifically incorporated by reference herein.

The broadcast audio output system generally includes an amplifier that receives electronic representation of a voice signal from the communication network interface 204. The amplifier 224 provides an amplified version of the electronic representation of a voice signal received from the communication network interface 204 to a broadcast speaker 228. The broadcast speaker 228 may be a conventional audio output speaker.

The handset 128 provides an amplifier 232 and a speaker 236. The amplifier 232 receives a representation of a voice communication from the communication network interface 204, amplifies that signal, and provides the amplified signal to the speaker 236. The speaker 236 is adapted for outputting an audible signal to the user 112 when the speaker 236 is held close to the car of the user 112, such as when the handset or headset 128 is operably positioned with respect to the user 112. The handset or headset 128 additionally provides a microphone 240 and an amplifier 244. The microphone 240 generally receives a voice signal from the user 112, converts that signal to an electronic representation that is amplified by the amplifier 244 and provided to the communication network interface 204 for transmission across the communication network 108.

The audio input system 124 generally includes a microphone 248 configured to receive a voice communication from the user 112 even when the microphone 248 is not positioned directly in front of the mouth of the user 112. Accordingly, the microphone 248 can be considered to be a far talk type device. The microphone 248 converts the voice communication signal received from the user 112 to an electronic representation of that signal that is amplified by an amplifier 252 and provided to the communication network interface 204 for transmission across the communication network 108.

Figure 3:
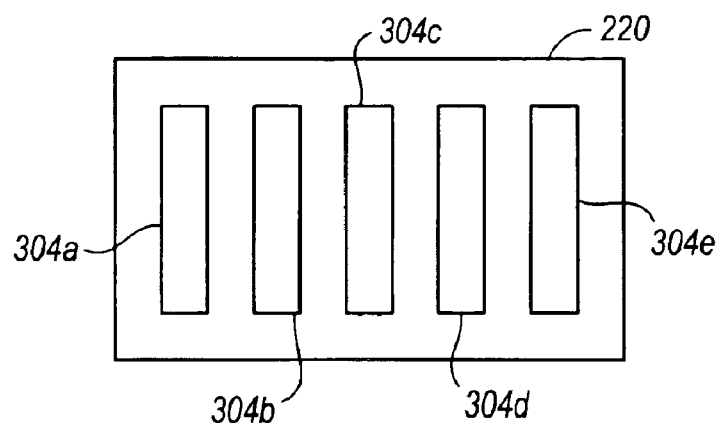
FIG. 3 depicts an acoustic transducer comprising an array of transducer elements.

With reference now to FIG. 3, an acoustic transducer 220 in accordance with an embodiment of the present invention is illustrated in plan view. As shown in FIG. 3, the acoustic transducer 220 may comprise a plurality of transducer elements 304. In accordance with an embodiment of the present invention, the acoustic transducer elements 304 each comprise a piezoelectric transducer or capacitive type transducer. As shown in FIG. 3, the elements 304 of the acoustic transducer 220 may be configured in an array of elements 304. In addition to the linearly disposed arrangement illustrated in FIG. 3, other configurations are possible. For example, transducer elements 304 may be arranged in a honeycomb type array or in a circular array. In general, each element 304 receives a version of the modulated carrier signal produced in the modulator 212 and amplified by the amplifier 216. Furthermore, each element 304 may be provided with a different signal.

With reference now to FIG. 4A, an arrangement of acoustic transducers 220 with respect to a user 112 in accordance with an embodiment of the present invention is illustrated. In general, a first acoustic transducer 220a is arranged so that it produces a first projection path 404a that intersects a location occupied by the user 112. Similarly, the second acoustic transducer 220b is configured such that a second projection path 404b produced by the second acoustic transducer 220b intersects the location occupied by the user 112. The configuration depicted in FIG. 4A is useful in connection with providing a spatial reference to the user 112. In particular, separate acoustic transducers 220 having projection paths 404 that intersect with the location of a single user 112 are useful in providing a stereo sound output. In addition, this configuration is useful in providing spatial cues to the user 112. For example, a voice communication signal received from a first remote caller may be provided through the first acoustic transducer 220a, and a voice communication signal received from a second remote user may be provided through the second acoustic transducer 220b. Because of the spatial separation between the first 220a and second 220b acoustic transducers, the user 112 is provided with a spatial cue as to the identity of the party providing a voice communication at any one time. In addition, it will be noted that the basic configuration illustrated in FIG. 4A provides a signal or signals that can only be heard by a user 112 located along a projection path 404 of an acoustic transducer 220. Accordingly, the output is narrowly focused, rather than being broadcast, enhancing the privacy of the communication. As can be appreciated, if only a first acoustic transducer 220a is provided, the configuration illustrated in FIG. 4A is an example of the ability of the present invention to provide a speaker phone or hands-free telephony with a private output in connection with a single acoustic transducer 220 or a single area limited audio output system 116. As can further be appreciated, more than two acoustic transducers 220 may also be used in connection with providing spatial information to a user 112.

It should be noted that assigning remote speakers/audio sources to different acoustic transducers 220 is just one method of providing spatial cues. More advanced techniques allow for a large range of perceived source positions to be realized with two or more acoustic transducers 220. These techniques include independently manipulating properties of the signals sent to each acoustic transducer 220. These properties may include the delay between outputting the sound on each acoustic transducer 220, the phase of the signal on each acoustic transducer 220 and the amplitude of each signal on each acoustic transducer 220. Using such techniques, the number of audio sources (or number of remote speakers) that can be represented by assigning a spatial location is not directly limited by the number of sound sources (i.e. acoustic transducers 220) available. More audio sources can provide a higher degree of accuracy or perceived separation between the spatial location of sounds for the listener.

With reference now to FIG. 4B, another possible configuration between users 112 and acoustic transducers 220 in accordance with an embodiment of the present invention is illustrated. In FIG. 4B, the first acoustic transducer 220a provides a first projection path 404a. A first user 112a is located along the first projection path 404a. The second acoustic transducer 220b provides a signal along a second projection path 404b. A second user 112b is located along the second projection path 404b. Because an audible signal is only perceivable along the projection paths 404, the first user 112a hears only the audible signal associated with the first projection path 404a, while the second user 112b hears only the audible signal associated with the second projection path 404b. Accordingly, different audible signals may be provided by the first acoustic transducer 220a and the second acoustic transducer 220b. The configuration generally illustrated in FIG. 4B is useful where speaker phone or hands-free operation is desirable but where conventional broadcast output would be disruptive. In addition, the configuration generally illustrated in FIG. 4B can be used to provide a first version of a signal to a first user 112a and a second version of a signal to the second user 112b. For example, the first user 112a may receive a voice communication in a first language (e.g., English) and the second user 112b can receive a translation of that voice communication into a second language (e.g., German). Furthermore, the different voice communications can be provided simultaneously, without interfering with one another.

With reference now to FIG. 5, still another arrangement of acoustic transducers 220 with respect to users 112 is illustrated. In particular, three acoustic transducers 220a–220c are configured to provide audible signals to a first user 112a. An additional three acoustic transducers 220d–220f are configured to provide audible signals to a second user 112b. By controlling the relationship between the acoustic transducers 220 and the users 112, the projection paths 404 along which audible signals can be perceived can be targeted to the intended user 112. Furthermore, by providing multiple locations from which audible signals may be provided to a user 112, the configuration illustrated in FIG. 5 is useful in connection with providing spatial cues to the users 112. Furthermore, because the audible signals provided to the first user 112a and the second user 112b are provided only to the intended user 112, the signal provided to the first user 112a may be different from the signal provided to the second user 112b, without those different communications interfering with one another.

Figure 6:
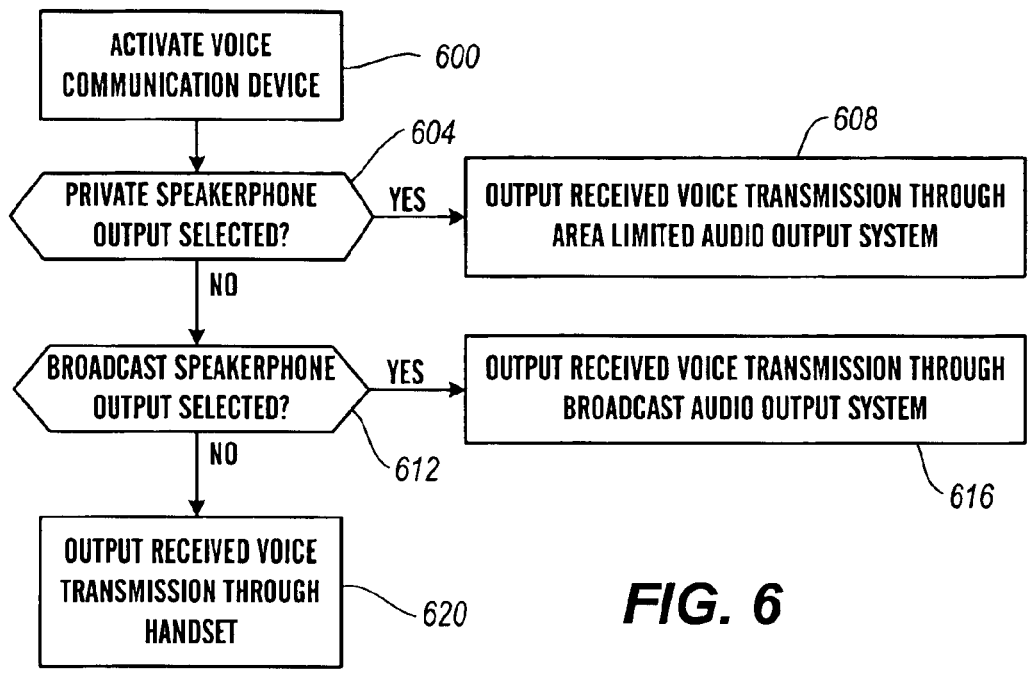
FIG. 6 is a flow chart depicting the operation of a voice communication device in accordance with an embodiment of the present invention.

With reference now to FIG. 6, the operation of a speaker phone or hands-free telephony system in accordance with an embodiment of the present invention is illustrated. Initially, at step 600, a user 112 activates the voice communication device 104. For example, the user may depress a button enabling operation or lift a handset from a corresponding cradle. At step 604, a determination is made as to whether the user 112 has selected the use of a private speaker phone. The selection of a private speaker phone may be made, for example, by selecting the appropriate button during the step of activation (step 600). If use of a private speaker phone output has been selected, the received voice transmission is output through an area limited audio output system 116 (step 608).

If at step 604 it is determined that a private speaker phone operation has not been selected, a determination is made as to whether broadcast speaker phone output has been selected (step 612). If broadcast speaker phone output has been selected, the received voice transmission is output through the broadcast audio output system 120 (step 616).

If broadcast speaker phone output has not been selected, the received voice transmission is output through the handset (or headset) 128 (step 620).

From the description given above, it can be appreciated that an embodiment of the present invention may provide multiple output options to the user 112. In particular, a voice communication device 104 in accordance with the present invention may be configured to selectively provide an area limited audio output, a broadcast audio output, or a conventional handset or headset output. Furthermore, it should be appreciated that a combination of such outputs may be provided. For example, an area limited audio output may be utilized concurrently with output provided through a handset.

Figure 7:
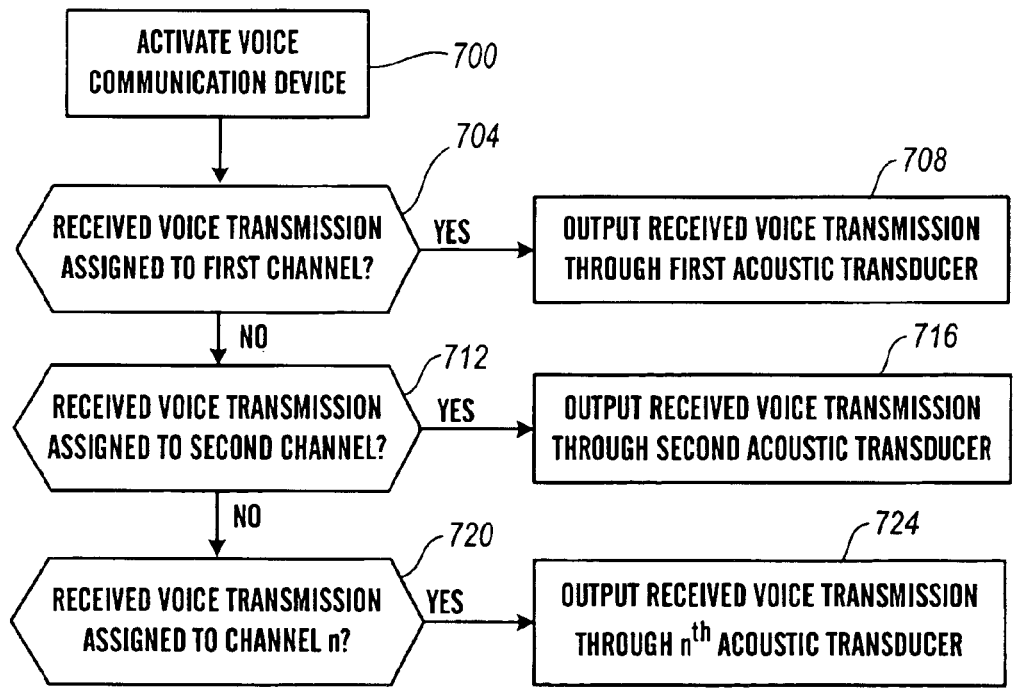
FIG. 7 is a flow chart depicting the operation of a voice communication device in accordance with another embodiment of the present invention.

With reference now to FIG. 7, the operation of another embodiment of a voice communication device 104 in accordance with the present invention is illustrated. Initially, at step 700, the voice communication device 104 is activated. At step 704, a determination is made as to whether a received voice transmission has been assigned to a first channel. If the received voice transmission is assigned to the first channel, the received voice transmission is output through a first acoustic transducer 220 (step 708). If the received voice transmission is not assigned to the first channel, a determination is made as to whether it is assigned to a second channel (step 712). If the received voice transmission is assigned to the second channel, that voice transmission is output through a second acoustic transducer 220 (step 716).

If the received voice transmission has not been assigned to a second channel, a determination is made as to whether the received voice transmission has been assigned to channel n. If the received voice transmission has been assigned to channel n, it is output through an $n^{th}$ acoustic transducer 220 (step 724). If at step 720 it cannot be determined that a received voice transmission has been assigned to an $n^{th}$ channel, the system may return to step 704.

From the description given above, it can be appreciated that, depending on a channel with which a received voice communication is associated, an appropriate acoustic transducer can be selected for outputting a signal representing that voice communication. Accordingly, channels corresponding to particular sources of signals can be assigned to particular acoustic transducers 220. In this way, voice communications can be provided to users 112 at a single location selectively. Furthermore, the use of selected acoustic transducers 220 in connection with assigned channels can be utilized to provide spatial cues as to the identity of the source of the communication.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for providing a private speaker phone output signal, comprising:
   providing a voice communication device;
   receiving at said voice communication device a transmitted first voice signal;
   providing a first acoustic transducer interconnected to said voice communication device;
   outputting a first ultrasound signal from said first acoustic transducer, wherein said first ultrasound signal produces an audible reproduction of said first voice signal along a first projection path;
   receiving at said voice communication device a transmitted second voice signal;
   providing a second acoustic transducer interconnected to said voice communication device; and
   outputting a second ultrasound signal from said second acoustic transducer, wherein said second ultrasound signal produces an audible reproduction of said second voice signal along a second projection path.

2. The method of claim 1, wherein said first voice signal is received from a first talker and wherein said second voice signal is received from a second talker.

3. The method of claim 1, wherein said first projection path and said second projection path converge in an area occupied by a first user.

4. The method of claim 1, wherein said first voice signal is received from a first voice channel and wherein said second voice signal is received from a second voice channel.

5. The method of claim 1, wherein said first voice signal comprises a first channel of a first stereo signal and said second voice signal comprises a second channel of said first stereo signal.

6. The method of claim 1, wherein said first acoustic transducer and said second acoustic transducer are separated by a first distance.

7. The method of claim 1, wherein said transmitted second voice signal is a translation of said first voice signal.

8. The method of claim 1, wherein said first projection path is not aligned with said second projection path.

9. A method for providing a private sneaker phone output signal, comprising:
   providing a voice communication device;
   receiving at said voice communication device a transmitted first voice signal;
   providing a first acoustic transducer interconnected to said voice communication device;
   outputting a first ultrasound signal from said first acoustic transducer, wherein said first ultrasound signal produces an audible reproduction of said first voice signal along a first projection path; and
   wherein said voice communication device is interconnected to at least one of a switched circuit telephony network and a packet data network.

10. The method of claim 9, further comprising:
    providing a microphone interconnected to said voice communication device; and
    transmitting a voice signal received at said microphone.

11. The method of claim 9, further comprising:
    adjusting a position of said first acoustic transducer, wherein said first projection path is altered.

12. The method of claim 9, wherein said audible reproduction of said first voice signal is not audible to a listener not located along said projection path.

13. The method of claim 9, wherein said switched circuit telephony network comprises the public switched telephony network, and wherein said packet data network comprises the Internet.

14. A speaker phone apparatus, comprising:
    a first transmitted voice signal input;
    a first oscillator for producing a first carrier signal;
    a first modulator interconnected to said first transmitted voice signal input and to said first oscillator, wherein said first carrier signal is modulated by a transmitted voice signal received at said first transmitted voice signal input from at least one of a switched circuit telephony network and a packet data network to produce a first modulated signal; and
    a first acoustic transducer, wherein said first acoustic transducer produces a reproduction of said transmitted voice signal along a first projection path.

15. The apparatus of claim 14, further comprising:
a speaker interconnected to said first transmitted voice signal input, wherein in a first mode of operation an area limited output is provided by said acoustic transducer, and wherein in a second mode of operation a broadcast output is provided by said speaker.

16. The apparatus of claim 14, wherein said first acoustic transducer comprises an array having a plurality of transducer elements.

17. The apparatus of claim 16, wherein said transducer elements comprise membrane transducer elements.

18. The apparatus of claim 16, wherein said transducer elements comprises piezoelectric transducer elements.

19. The apparatus of claim 14, wherein said first carrier signal has a frequency of above about 40 kHz.

20. A speaker phone apparatus, comprising:
a first transmitted voice signal input;
a first oscillator for producing a first carrier signal;
a first modulator interconnected to said first transmitted voice signal input and to said oscillator, wherein said first carrier signal is modulated by a transmitted voice signal received at said first transmitted voice signal input to produce a first modulated signal;
a first acoustic transducer, wherein said first acoustic transducer produces a reproduction of said transmitted voice signal along a first projection path; and
a second acoustic transducer, wherein said second acoustic transducer produces a reproduction of said transmitted voice signal along a second projection path.

21. The apparatus of claim 20, wherein said first and second projection paths intersect one another.

22. A speaker phone apparatus, comprising:
a first transmitted voice signal input;
a first oscillator for producing a first carrier signal;
a first modulator interconnected to said first transmitted voice signal input and to said oscillator, wherein said first carrier signal is modulated by a transmitted voice signal received at said first transmitted voice signal input to produce a first modulated signal;
a first acoustic transducer wherein said first acoustic transducer produces a reproduction of said transmitted voice signal alone a first projection path;
a second transmitted voice signal input;
a second modulator interconnected to said second transmitted voice signal input and to one of said first oscillator and a second oscillator for providing a second carrier signal, wherein said one of said first carrier signal and said second carrier signal is modulated by a transmitted voice signal received at said second transmitted voice signal input to produce a second modulated signal; and
a second acoustic transducer, wherein said second acoustic transducer produces a reproduction of said second transmitted voice signal along a second projection path.

23. A speaker phone apparatus, comprising:
means for receiving at least a first transmitted voice signal from a communication network; and
ultrasonic means for projecting said at least a first transmitted voice signal along a first projection path, wherein an audible reproduction of said transmitted voice signal is produced along said first projection path.

24. The apparatus of claim 23, further comprising:
means for receiving a voice signal from a user located along said first signal path.

25. A speaker phone apparatus, comprising:
means for receiving at least a first transmitted voice signal;
ultrasonic means for projecting said at least a first transmitted voice signal long a first projection path, wherein an audible reproduction of said transmitted voice signal is produced along said first projection path; and
means for projecting a second transmitted voice signal along a second projection path, wherein an audible reproduction of said transmitted voice signal is produced along said second projection path.

26. The apparatus of claim 25, wherein said first and second projection paths intersect one another.

27. The apparatus of claim 25, wherein said first transmitted voice signal comprises a first channel and said second transmitted voice signal comprises a second channel of a stereo signal.

* * * * *